July 17, 1934.  W. M. EMERY  1,967,086
IRONING PRESS
Filed Jan. 13, 1933  2 Sheets-Sheet 1

INVENTOR.
William M. Emery

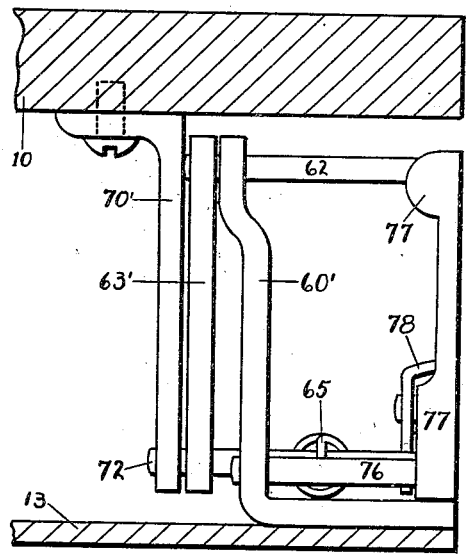
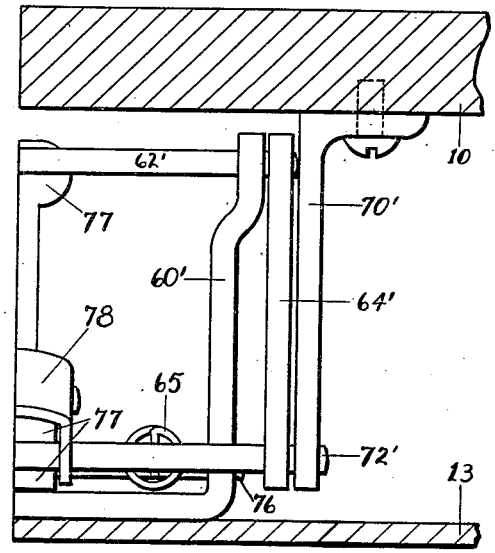
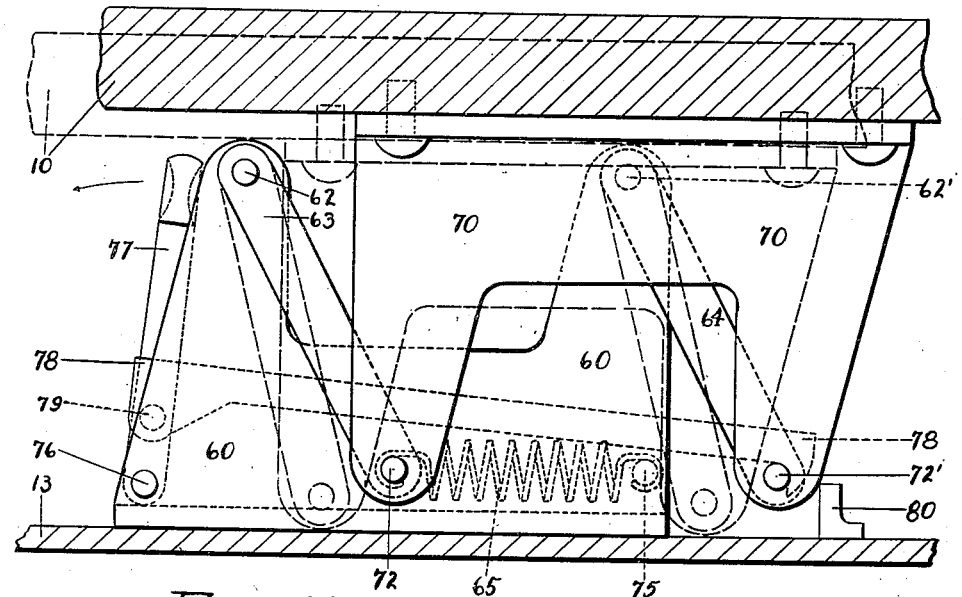

Patented July 17, 1934

1,967,086

UNITED STATES PATENT OFFICE 1,967,086

IRONING PRESS

William M. Emery, Lansdowne, Pa.

Application January 13, 1933, Serial No. 651,451

21 Claims. (Cl. 68—9)

My present invention relates to ironing and pressing machines.

In designing structure to translate a vertical pressure movement into a horizontal movement, which is a purpose of this invention, the most important consideration is the securing of a sufficient horizontal movement with a minimum expenditure of vertical movement. The reason for this is more apparent when one considers that the translated movement occurs at the end of the actuating stroke and that, on account of the eccentric leverage used, 75% of the movement of the actuator is frequently consumed in producing the final half or ⅜ of an inch of the entire movement.

On account of the friction of rest or the tendency of the parts at rest and the surfaces supporting them to stick together, the greatest horizontal resultant of the applied forces is required at the time of the initiation of the translation of the pressure producing forces to effectuate the frictional or ironing movement. Accordingly, an object of this invention is to provide a construction such that the horizontal resultant of the applied forces is greatest at the beginning of the movement and thereafter grows less as the frictional movement advances.

In comparison to a system where the horizontal resultant is the least at the commencement of the frictional movement and increases as the said movement advances, my invention reduces very materially the amount of movement subtracted from the pressure producing movement to effectuate the frictional movement.

The applicant wishes to further differentiate the field of his invention and his structure from that of those machines found in the art which move one element while in contact with the other slightly longitudinally to effect a horizontal pressure against an upright portion of a garment, such as the neckband of a shirt. The peculiarity of such a structure lies in the fact that the side movement in length is less than the vertical movement which produces it, with the obvious result that during the lateral movement the vertical forces are too slight to produce, and the lateral movement too short to effect, substantial friction, and that the lateral forces are greater in pounds than the vertical forces which produce them. (All of which is the reverse of the effect desired by the applicant.) Putting it in another way, when radius arms are used to effect the lateral pressure they operate at an angle of less than 45 degrees to the contactual plane of the elements. This is in contrast to the field of invention of the applicant in which the radius arms operate in a sector of 50 to 90 degrees relative to the contactual plane, because the applicant's invention has for objects the effectuation of a maximum vertical pressure rather than a maximum lateral pressure, and also a substantial and maximum frictional action for ironing the flat surfaces of the fabrics with a minimum consumption of vertical forces; and to provide means so that the various movements of his press may be more efficiently controlled by a single control handle to effect at the election of the operator either pressure without a substantial frictional movement, or pressure with a substantial frictional movement, both movements being effectuated by the application of substantially equivalent amounts of energy.

Stating this another way if the radius arms operate at an angle of 45 degrees to the contactual plane of the elements, then the head will slide on the buck the same distance that the head recedes under pressure—or another way, the sliding distance is equal to the amount of movement perpendicular to the said contactual plane required to produce the sliding movement as a resultant thereto. As the angle of the radius arm increases, that is from 45 degrees towards 90 degrees, the ratio of the sliding movement to the recessional or perpendicular movement increases. For instance, with the radius arms forming an angle of 54 degrees with the contactual plane of the elements a perpendicular movement of one inch will convert into a sliding movement of one inch and a half.

Another object is to provide simple control means to elect either pressure and friction or pressure only and a further object is to cause the final position of the elements when pressure only is desired to be substantially identical with the final position of said elements when friction and pressure are used.

Another object is to provide means to maintain a pressure between the elements equalized front to back at the beginning of and during the frictional movement.

Another object is to provide simple means for moving one element across the other to provide friction therebetween and means inherent in the balance and suspension of the parts thus moved to normally return them to their first position.

These and other objects will be apparent from the specifications and claims which follow.

The features of this invention being subject to many variations of structure without departing from their basic principles, interpretation of this application is not intended to be limited to the structures herein exemplified.

In the drawings:

Figure 5 is a fragmentary front view of one half of an equilateral supporting mechanism for a buck featuring some of the principles of the invention;

Figure 6 is a fragmentary rear view of Figure 5;

Figure 7 is a fragmentary view of the right half of a mechanism corresponding to the left half shown in Figures 5 and 6, and, Figure 8 is a fragmentary side view of a press similar in general form to Figure 4, but utilizing the mechanism shown in Figures 5 to 7, except that the mass of the parts is utilized to return them to their original position.

Figures 1, 2, 3:
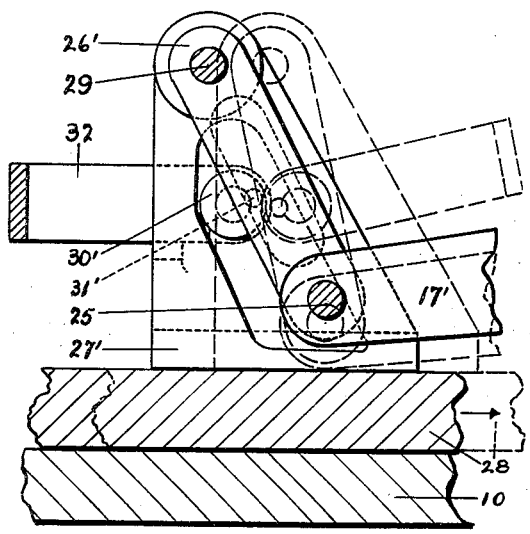
Figure 1 shows a sectional view cut along line 1—1, Figure 2, of a mechanism associated with a pressing head and illustrative of some of the principles of this invention.
Figure 2 is a fragmentary front view of the parts shown in unbroken lines in Figure 1.
Figure 3 is a fragmentary front view of a right hand twin mechanism corresponding to that shown in long dash lines in Figure 1.

Full lines and finely broken lines indicate the position of the parts upon the initiation of the frictional movement. Long dash broken lines indicate the position assumed by the parts at the termination of the frictional movement or the pressure-only movement. Similar numbers identify identical parts in all views.

Referring now to the structural detail, Figures 1 to 4 show a buck 10 of any suitable design customary in the art, supported by means of a support member 12, which may be slightly resilient although substantially rigid, from a table 13, which is in turn supported by a bifurcated frame work, including two left and right leg and cross member portions 14 and an upright portion 15, in which a pair of fulcrumed arms 17 and 17' are pivotally mounted by a rod 16. To the rearward ends of arms 17 and 17' is pivotally attached an upper toggle member 18. A bifurcated and lower toggle member 19 is pivoted to the upper member and also pivoted to portions 14 of the frame work. The toggle is operated by a link 20 and a crank 21, operable by a motor and gear box 22, of any suitable design, mounted on frame portion 14.

A rod 25 passes through the forward end of the pair of arms 17 and 17' and through two radius arms 26 and 26' forming a pivotal connection therebetween. Radius arms 26 and 26' normally incline upwardly from rod 25. The upper ends of said radius arms are pivotally connected by rod 29 to two uprights or hangers 27 and 27' which extend from, and are fixed to, a pressing head 28 of any suitable design adapted to be heated. It should be noted that the ends of the radius arms, 26 and 26', most remote from the pressing head are the most directly associated with the head. In this, my invention is different from the art of record.

There are journalled in the hangers 27 and 27' headed studs 30 and 30' with pins 31 and 31' eccentrically mounted respectively therein. A bail-like control handle 32 interconnects the headed studs 30 and 30'. The pins 31 and 31' operate in channels, formed in radius arms 26 and 26' respectively.

The mechanism just described functions to limit the movement and inclination of the radius arms and to elect whether or not they shall function to permit a frictional ironing movement simultaneously with the application of pressure between the head 28 and the buck 10.

In the drawings, as previously mentioned, the unbroken lines show the position of the parts at the instant the elements are first brought into complete contact and also show the handle 32 in a position to elect simultaneous application of both pressure and friction. In operation, commencing the explanation with the parts in the position just described the crank 21 continues to revolve counter-clockwise (Fig. 4), thereby straightening the toggle joint (18 plus 19) and depressing the forward points of the pair of beams 17 and 17' applying pressure between the elements. Because of this pressure, the radius arms 26 and 26' assume a more vertical position, causing the head 28 together with hangers 27 and 27' to move rearwards (see arrow Fig. 4) on the buck, producing friction therebetween. This movement will continue until the angle of the radius arm becomes so near vertical that the horizontal resultant of the applied forces is insufficient to further overcome the frictional factors resisting the movement or until pins 31 and 31' contact with the channels of the radius arms 26 and 26', thereby blocking further movement.

At this point, the crank 21 is straight forward, the toggle members 18 and 19 are in a straight line with each other and the head 28 has assumed the long dash line position shown in Fig. 1 and the unbroken line position shown in Fig. 3.

In this position, the crank 21 may come to rest by virtue of a switch or clutch means (not shown).

If now crank 21 continues or resumes its revolving, the forward portion of beams 17 and 17' will be raised thereby and the mass of the pressing head will cause the radius arms to assume a more inclined position, thereby sliding or dragging the head horizontally over the buck in a forward direction producing a supplemental frictional movement.

Figure 4:
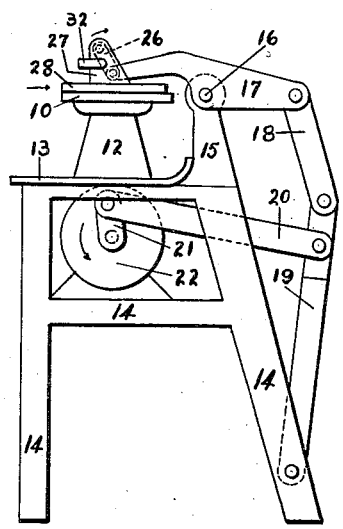
Figure 4 is a press of a conventional construction to which have been added the parts shown in Figures 1 to 3.

A movement of the control handle 32 into the position shown in long dash lines in Fig. 1 causes the radius arms 26 and 26' to be immediately moved and set in the more vertical position shown in long dash lines. This raises the head slightly and causes it to move rearwardly so that, when it first contacts with the buck, the rear edges of the elements will be in register instead of the front edges being in register as shown in Fig. 4. In other words they are immediately in a similar position to that assumed by the parts at the completion of the first or primary frictional movement; and when the parts are locked in this position by control handle 32 a frictional movement of the head is impossible. The parts are thereby prearranged for "pressure only".

It is most desirable in electing between friction pressure or pressure only that the final position of the elements in both cases be identical so that similar pressures may be obtained without varying the height of the stationary element or varying the length of the stroke actuating the movable element.

It is also important in domestic apparatus that controls, such as 32, be simple and operable by a quick single motion of the operator and arranged to definitely select one of two alternatives, eliminating intermediate or graduated positions which offer only a confusing complication without utility. This is especially true in the applicant's structure, because in it no nice adjustment is necessary to make it operable.

In the modification shown in Figures 5 to 8, the parts identical and unchanged from the previously described and preferred structure are identified by the retention of their original numerical designations.

The head 28 (Fig. 8) is supported by hangers 51, which are directly and pivotally connected to the pair of fulcrumed arms 17 and 17' by a rod 52.

In all the constructions shown the head is pivotally connected to the arms 17 and 17' and hangs therefrom in stable equilibrium.

The chief difference of construction between Figures 1 to 4 and Figures 5 to 8 lies in the transposition of the means to translate the vertical movement into a horizontal ironing movement, from on top of the head to a position below and supporting the buck.

Figure 8:
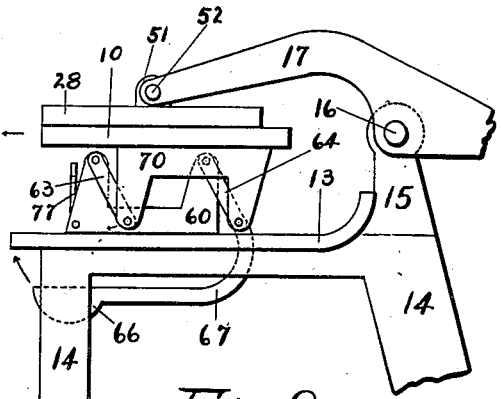

Rising from the table 13 are two double hangers 60 and 60'. Four links or radius arms 63 and 63', 64 and 64' are pivoted in the tops of these by two rods 62 and 62', these links or radius arms being normally held in or returned to an inclined position by springs 65 as shown in Figures 5 to 7, or as shown in Figure 8 by a weight 66 on arm 67 which is integral with at least one of the links.

Extending downward from buck 10 are two double hangers 70 and 70' which are pivoted to the lower ends of the links or radius arms 63, 63', 64 and 64' by rods 72 and 72'. A tie rod 75 extends between rearward portions of hangers 60 and 60', and the springs 65 (the function of which was previously mentioned) are attached at one end to tie rod 75 and at the other end to rod 72.

Another tie rod 76 extends between the forward portions of hangers 60 and 60'. A control handle 77, constituting a toggle member, is mounted centrally of rod 76 to turn thereon. A double hook 78 formed with a channel shaped transverse cross section constitutes the other member of the toggle and is pivotally attached to control handle 77 by pin 79 intermediate of the ends of handle 77 and normally engages the rear side of rod 72'. When the control handle 77 is in the position shown, the links or radius arms are normally inclined to their maximum limit. They are however, free to move to the more vertical position shown in long dash lines in Figure 7, and would so move if a downward pressure were applied to the buck 10. A stop 80 (Fig. 7) limits the initial inclination of the links or radius arms. When the control handle is turned counter-clockwise (Fig. 7) to a substantially horizontal position, hook 78 pulls and locks rod 72' in a forward position thereby preventing any horizontal or frictional movement of the buck when downward pressure is applied by the head. It should be noted that so long as the controls 32 or 77 are mounted to insure substantially free and frictionless operation, that it is impossible for them to remain in an intermediate position. If control 32 were placed for example in a vertical position, then the forces normally causing the radius arms 26 and 26' to assume a position of maximum inclination to the vertical would cause it to assume the full line position immediately.

The applicant believes it unnecessary to describe the operation of the modified constructions in detail, because from the drawings and the construction already described it would appear to be obvious. The operation is substantially the same as that of the preferred form shown in Figures 1 to 4.

I claim:

1. In a press for fabrics, a head and a buck constituting pressing and ironing elements, means to mount one of said elements for movement towards and away from the other, radius arm means to support one of said elements, one pivot of each radius arm means being fixed as to one of said elements, and the position of the other pivot of each radius arm being fixed against bodily movement in a plane parallel to the plane of the contacting elements, and means to apply pressure to one element, when said elements are in contact, in a direction perpendicular to the contacting plane of the elements and operative responsively thereto to move the radius arm means into a position more right angular to the contactual plane of said elements and to accordingly produce a frictional movement between the elements.

2. A device as set forth in claim 1, wherein there is a selective control means to pre-arrange the radius arm means in its more right angular position before the elements are in contact with each other, thereby preventing friction between the elements.

3. In a press for fabrics a buck and a head constituting pressing and ironing elements, a support arm for the head, an intermediary radius arm between the head and the support arm normally inclined from the plane of the face of the head, a pivotal connection between said head and the upper part of said radius arm, a pivotal connection between said support arm and the lower part of said radius arm, means to move the support arm towards the buck to bring the head and buck into contact and to further force the support arm towards the buck to apply pressure, and incident thereto to shorten the distance between the support arm and the face of the head by changing the angle of the inclination of the radius arm and accordingly to produce a frictional movement of the head against the buck.

4. A device as set forth in claim 3, wherein there is provided selective control means to pre-arrange relatively the head, its support arm, and the intermediary radius arm in the final position mentioned in claim 3, previously to the contacting of the elements thereby preventing the frictional movement between the elements at the discretion of the operator.

5. In a press for fabrics, a buck and a head constituting pressing elements, a frame to support the elements, normally inclined radius arms to mount the buck, means to suspend the upper pivot of the radius arms from the frame, means to support the buck from the lower pivot of said radius arms and means to apply pressure against the buck thereby effectuating a position of the buck and radius arms more perpendicular to the buck and accordingly a sliding movement of the buck against the face of the head.

6. A device as described in claim 5, wherein there is selective control means to pre-arrange the radius arms in the more perpendicular position described in claim 5 before the contacting of the elements thereby preventing the frictional movement between the elements at the discretion of the operator.

7. A device as described in claim 5, wherein there is a selective control means to lock the radius arm means and parts associated therewith in a fixed position thereby preventing a frictional movement between the elements at the discretion of the operator.

8. In a press for fabrics, a buck and a head, constituting pressing and ironing elements, means to mount one of said elements for movement towards and away from the other, means to press one element against the other, a single pivotal control means for predetermining the position of one of said elements with reference to its support, said positions varying one from the other in effectuating an earlier or later contact between the elements, radius arm means operable in an angular sector between 50 and 90 degrees relative to the contactual plane of the elements to cause said one of said elements when in its earlier contactual position to recede as a result of the application of pressure and incident to said recession to move frictionally against the face of the other element a substantial amount, said single pivotal control means necessitating the election by the operator of one of the said predetermined positions of said one of the elements, either the earlier contactual position which allows for the frictional movement or the later contactual position approximating the final position under recession, thereby allowing or preventing the frictional movement.

9. In a press for fabrics a buck and a head constituting pressing and ironing elements, means to mount said elements for movement towards and away from the other, means to press one element against the other, two predetermined positions for one of said elements, one position being such as to effectuate an earlier contact between the elements, means to cause said one of said elements, when in its earlier contactual position to recede under the application of pressure and incident to said recession to slide frictionally against the face of the other element a distance of more than one and one-half times the amount of said recession, and unified control means necessitating an election by the operator of one of the two predetermined positions of the said one of the elements, either the earlier contactual position described, or the final position under recession described, the control thereby allowing or preventing frictional ironing movement of the one element against the other.

10. In a press for fabrics, a buck and a head constituting pressing and ironing elements, means to press one element against the other, means to effectuate a substantial frictional movement of one element against the other actuated by said first mentioned means and toggle control means operable at the will of the operator to pull one of said elements into a position wherein the first mentioned means is ineffective to produce said frictional movement.

11. In a pressing machine, a head and a buck constituting pressing elements, a substantially stationary support means for one element and operable support means for the other element, means to move the operable support means to separate and bring the elements together and to apply pressure therebetween, means positioned between one of said elements and its support means operable to produce a frictional movement of said element against the other, actuated by the said application of pressure, said means including a normally inclined radius arm, an operable connection between said element and the pivot of said radius arm most distant from the face of the said element, and an operable connection between the other pivot of the radius arm and the support means for said element.

12. A device as set forth in claim 11, wherein there is selective control means to set the radius arm means in a position preventing the frictional movement.

13. In a pressing machine a head and a buck constituting pressing elements, comparatively stationary support means for one element and operable support means for the other element, means to move the operable support means to bring the elements together and to apply pressure therebetween and means connecting one of said elements and its support means, and operable to recede under said pressure initially faster than thereafter and simultaneously with said recession to slide one element against the other.

14. A device as set forth in claim 13, wherein there is control means to allow or prevent the operation of the "means connecting one of said elements and its support means" mentioned in claim 13.

15. In a pressing machine, a head and a buck, constituting pressing and ironing elements, mounting means for said elements at least one of which is operable to effect separation and engagement of the elements, means to actuate said mounting means to press one element against the other, radius arm means interconnecting one of said elements with its mounting means, said radius arm means being operable in a sector between 55 and 90 degrees with the contactual plane of the elements and inclined at an angle to its associated element sufficient to produce a resultant of forces when said pressure is applied to effectuate a substantial ironing or frictional movement between the elements, unified control means operable to allow the substantial and full ironing movement or to completely prevent said movement, and means to prevent said control means from remaining in intermediate positions of control, thereby assuring to the operator complete and definite movements of the movable element.

16. In a press for fabrics, a buck and a head constituting pressing and ironing elements, means to mount one of said elements for movement towards and away from the other, means to press one element against the other, radius arm means operable in an angular sector between 50 and 90 degrees relative to the contactual plane of the elements to cause one of said elements to recede as a result of the application of pressure, and incident to said recession to move frictionally across the face of the other element a substantial amount, and a control handle and means associated therewith operable to effect an earlier or later contact between the elements, the earlier contact allowing for the said recession during the said frictional movement and the position of later contact providing an initial contactual position approximating the final position under recession and accordingly excluding the said frictional movement.

17. In a press for fabrics, a buck and a head constituting pressing and ironing elements, means to support said elements including means to mount one of said elements for movement towards and away from the other, means to press one element against the other, radius arm means supporting one of said elements operable in an angular sector between 50 and 90 degrees relative to the contactual plane of the elements to slide one element frictionally against the other incidental to the application of pressure between the elements, and means operated by a single control handle to substantially prevent the sliding frictional movement at the will of the operator while allowing a normal application of pressure.

18. In a press for fabrics, a buck and a head constituting pressing and ironing elements, means to mount said elements for movement towards and away from the other, means to press one element against the other, predetermined positions for one of said elements, one position being such as to effectuate an earlier contact between the elements, means to cause said one of said elements when in its earlier contactual position to recede under the application of pressure and incident to said recession to slide frictionally against the face of the other element, a distance at least one and one-half times the amount of said recession, and another predetermined position effectuating a later contact which precludes the frictional movement between the elements, and means operated by a single control handle to substantially prevent the sliding frictional movement at the will of the operator, while permitting a complete application of pressure.

19. In a press for fabrics, a buck and a head constituting pressing and ironing elements, means to press the head against the buck, means to effectuate a substantial sliding movement of the elements one against the other actuated by the first mentioned means, a latch cooperative with the second means, and a control handle for the latch operable to prevent said sliding movement.

20. In a pressing machine, a head and a buck constituting pressing and ironing elements, mounting means for said elements, at least one inch of which mounting means is operable to effect separation and engagement of the elements, means to actuate the mounting means to forcibly press one element against the other; radius arm means interconnecting one of said elements with its mounting means, said radius arm means being operable in a sector between 55 and 90 degrees relative to the contactual plane of the elements, and inclined at an angle to its associated element sufficient to produce a resultant of forces when said pressure is applied to effectuate a substantial ironing or sliding movement between the elements, a single control means operable to limit said movement.

21. In a pressing and ironing machine, the combination of a fixed pressing member and a movable pressing member, supporting means for each member, angularly displaceable link means for supporting one pressing member relative to its supporting means, said link means being pivotally secured at its remote end to the associated pressing member, the other end of the said link means being secured to said supporting means.

WILLIAM M. EMERY.